United States Patent [19]
Swanson

[11] Patent Number: 5,927,667
[45] Date of Patent: Jul. 27, 1999

[54] ELECTRICAL BOX MOUNTING BRACKET

[75] Inventor: Richard D. Swanson, Niles, Mich.

[73] Assignee: Hubbell Incorporated, Orange, Conn.

[21] Appl. No.: 08/720,136

[22] Filed: Sep. 27, 1996

[51] Int. Cl.[6] ...................................................... A47F 5/00
[52] U.S. Cl. ........................ 248/300; 248/906; 248/27.1; 174/54
[58] Field of Search ..................................... 248/300, 906, 248/342, 343, 344, 27.1; 174/58, 54; 220/3.9

[56] References Cited

U.S. PATENT DOCUMENTS

| | | |
|---|---|---|
| 1,288,024 | 12/1918 | Kendig . |
| 1,493,487 | 5/1924 | Frankenstein . |
| 1,786,004 | 12/1930 | Clayton . |
| 1,790,031 | 1/1931 | Vaughn . |
| 1,930,928 | 10/1933 | Dunlap, Sr. . |
| 1,933,358 | 10/1933 | Almcrantz . |
| 1,982,957 | 12/1934 | Knell . |
| 2,032,636 | 3/1936 | Seckinger . |
| 2,223,910 | 12/1940 | Gallagher . |
| 2,440,324 | 4/1948 | Blakeslee . |
| 2,969,418 | 1/1961 | Benander ........................... 248/27.1 X |
| 3,038,020 | 6/1962 | Winter et al. . |
| 3,182,805 | 5/1965 | Foster, Jr. et al. . |
| 3,659,037 | 4/1972 | MacDonald . |
| 3,746,931 | 7/1973 | Muranka ............................ 248/27.1 X |
| 3,917,899 | 11/1975 | Oliver . |
| 4,135,337 | 1/1979 | Medlin . |
| 4,444,369 | 4/1984 | Job ......................................... 248/27.1 |
| 4,569,458 | 2/1986 | Horsley . |
| 4,572,391 | 2/1986 | Medlin . |
| 4,603,789 | 8/1986 | Medlin, Sr. . |
| 4,757,967 | 7/1988 | Delmore et al. . |
| 4,964,525 | 10/1990 | Coffey et al. . |
| 4,967,990 | 11/1990 | Rinderer . |
| 5,005,792 | 4/1991 | Rinderer . |
| 5,114,105 | 5/1992 | Young ...................................... 248/27.1 |
| 5,330,137 | 7/1994 | Oliva . |
| 5,516,068 | 5/1996 | Rice ..................................... 248/906 X |

FOREIGN PATENT DOCUMENTS

| | | | |
|---|---|---|---|
| 1323716 | 3/1963 | France ...................................... 174/58 |

*Primary Examiner*—Peter M. Cuomo
*Assistant Examiner*—Hanh V. Tran
*Attorney, Agent, or Firm*—Jerry M. Presson; David L. Tarnoff; Joseph J. Buczynski

[57] ABSTRACT

An improved mounting bracket can be used to selectively support both 4 inch square electrical boxes and $4^{11}/_{16}$ inch square electrical boxes such that vertical movement of either type of electrical box is limited. The mounting bracket is preferably a one-piece, unitary member stamped from sheet metal. The mounting bracket has a top support rail, a bottom support rail and a pair of mounting ends coupling the support rails together to define a large, elongated central cut-out portion. An electrical box and its associated cover may be mounted between two wall studs by first attaching the mounting bracket of the present invention to the wall studs. The open front end of the box is then placed flush against the rear surface of the bracket such that a top portion of the box contacts the bottom rail of the bracket. Next, the associated cover is placed on the front surface of the bracket opposite and aligned with the box such that a top portion of the cover contacts the top support rail and a bottom portion of the cover contacts the bottom support rail. Finally, the electrical box and the cover are fastened together to complete installation of the electrical box to the bracket. The inner edges of the rails are spaced to engage the mounting screws of a 4 inch square electrical box such that the electrical box cannot significantly move up or down relative to the mounting bracket. The top and bottom support rails are each provided with an abutment for engaging either the outer surface of a $4^{11}/_{16}$ inch square electrical box or the faceplate of the $4^{11}/_{16}$ inch square electrical box such that the electrical box will not significantly move up or down relative to the mounting bracket when coupled thereto.

12 Claims, 7 Drawing Sheets

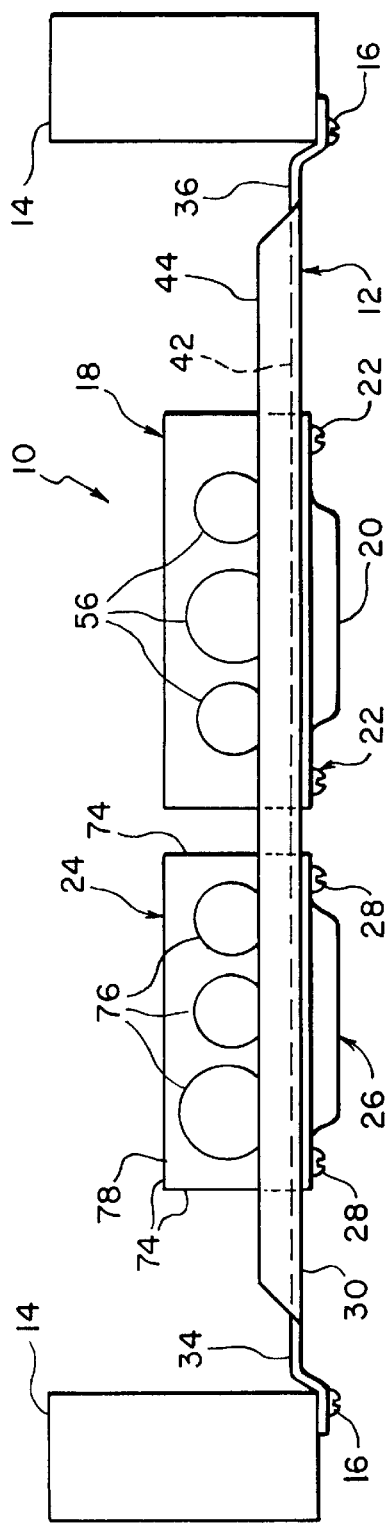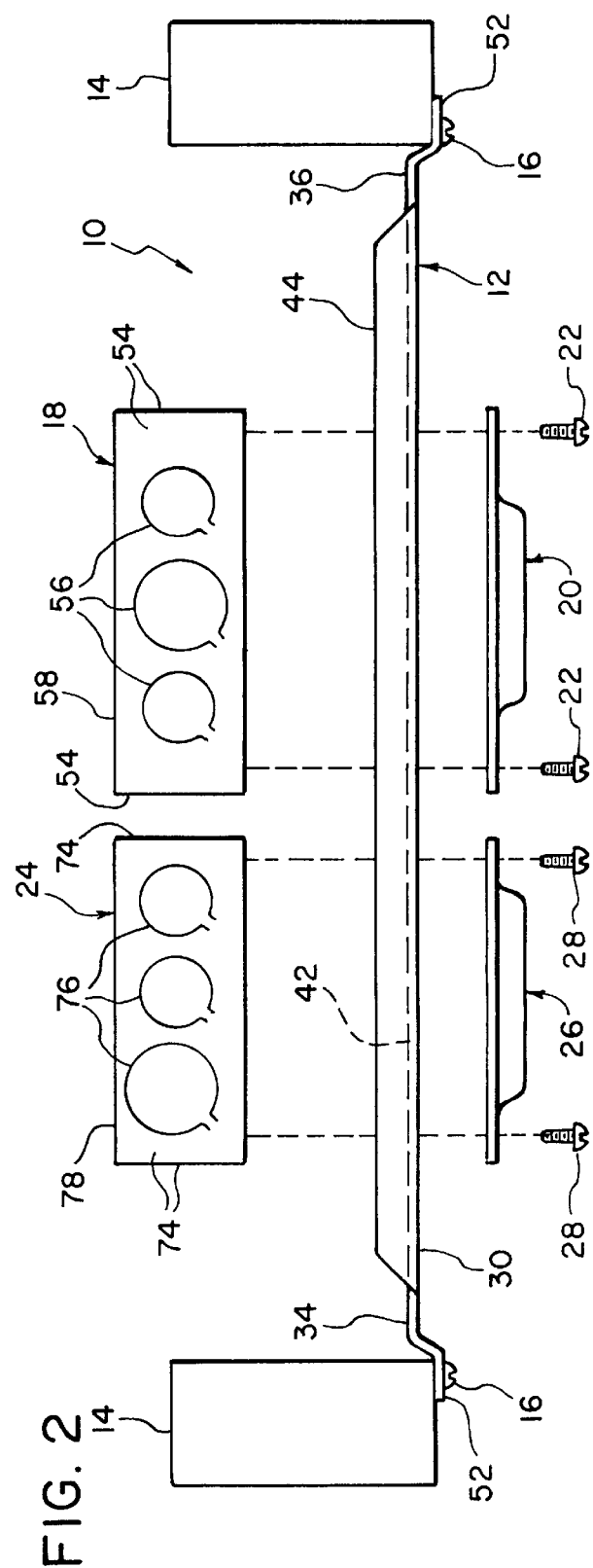
FIG. 1
FIG. 2

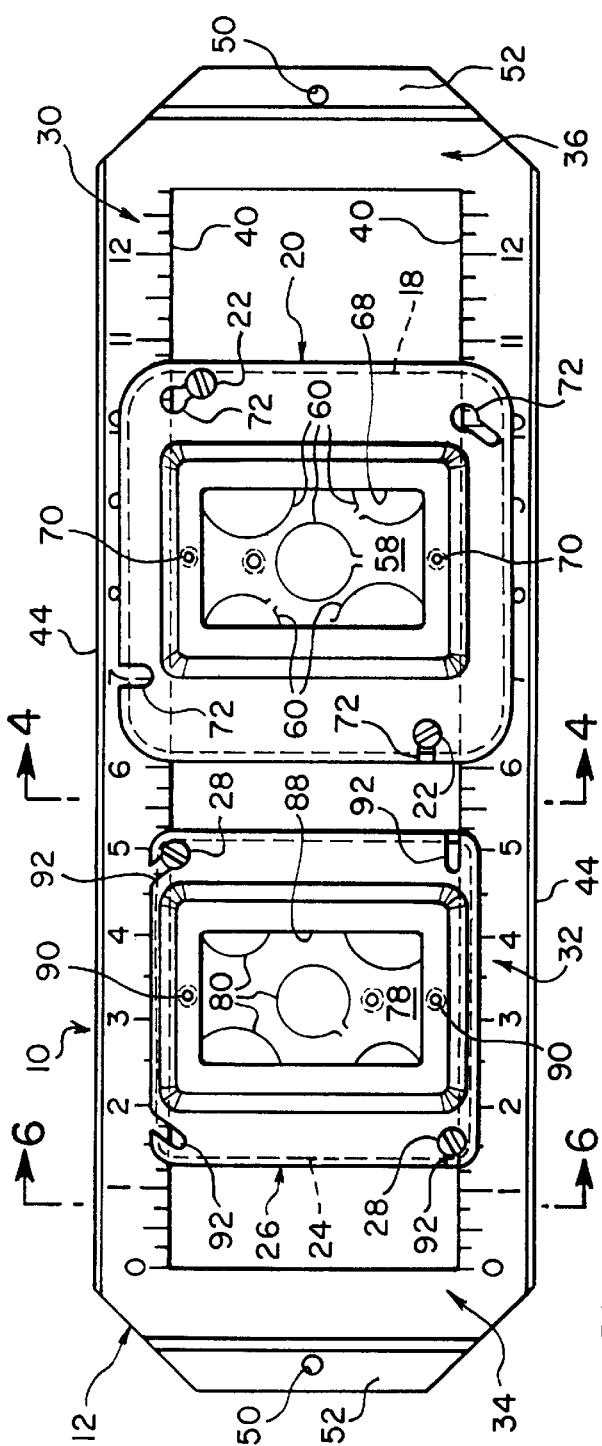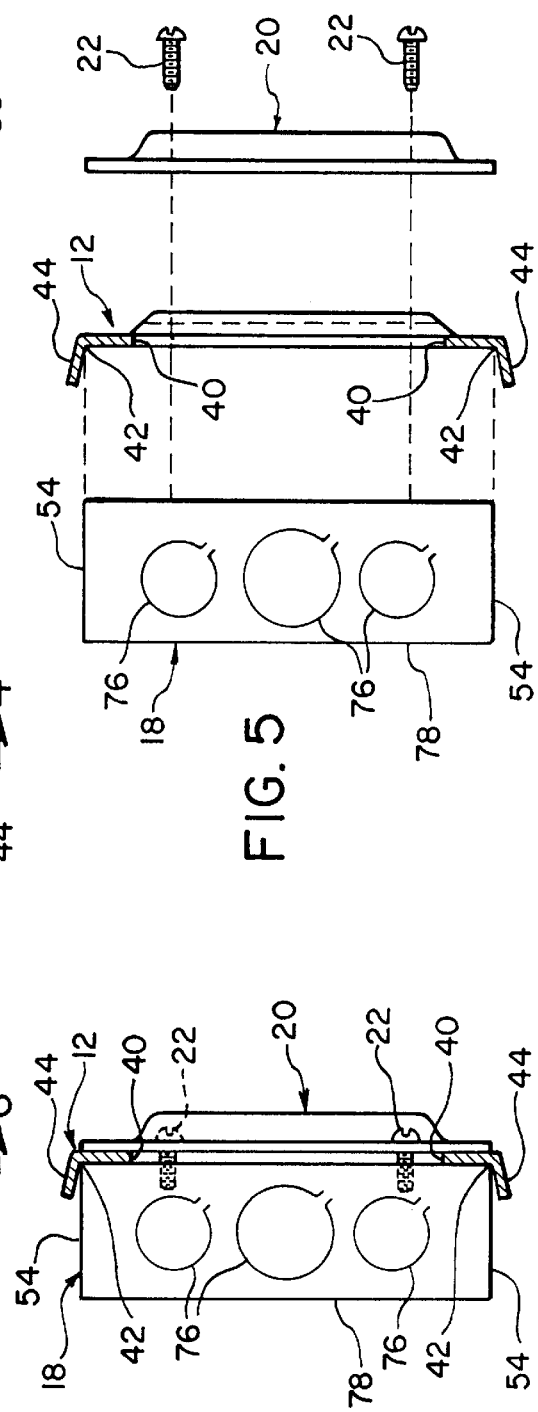

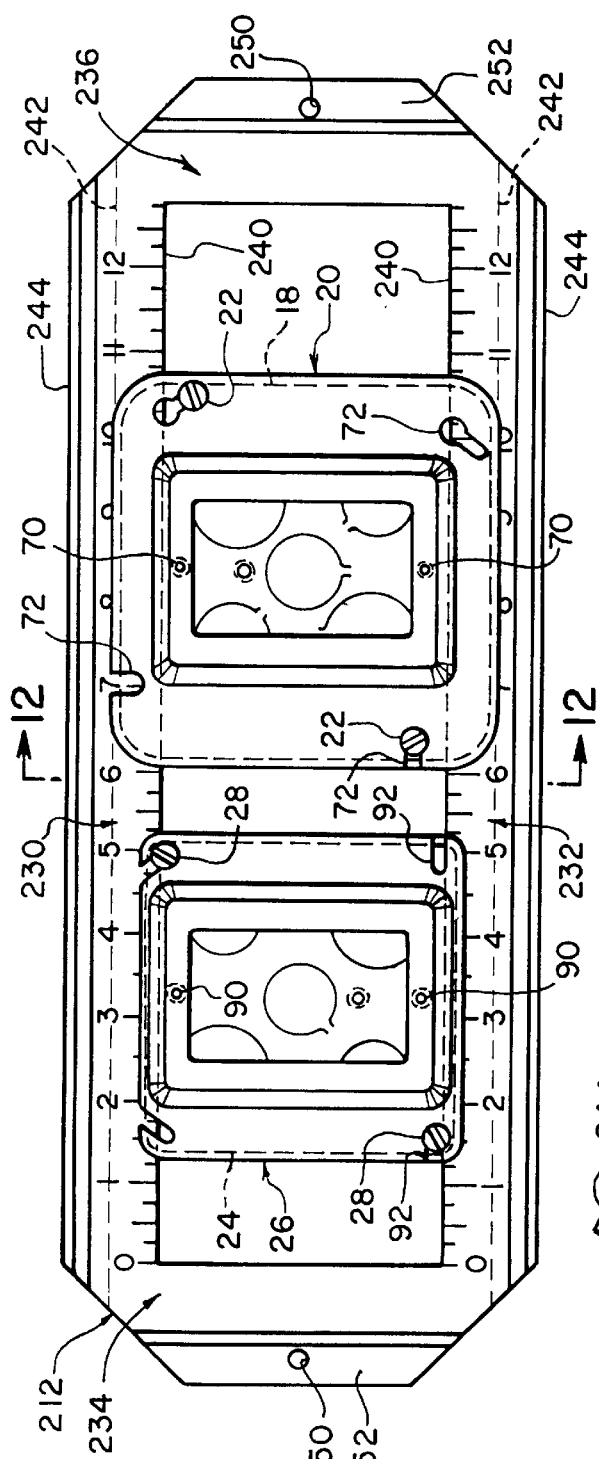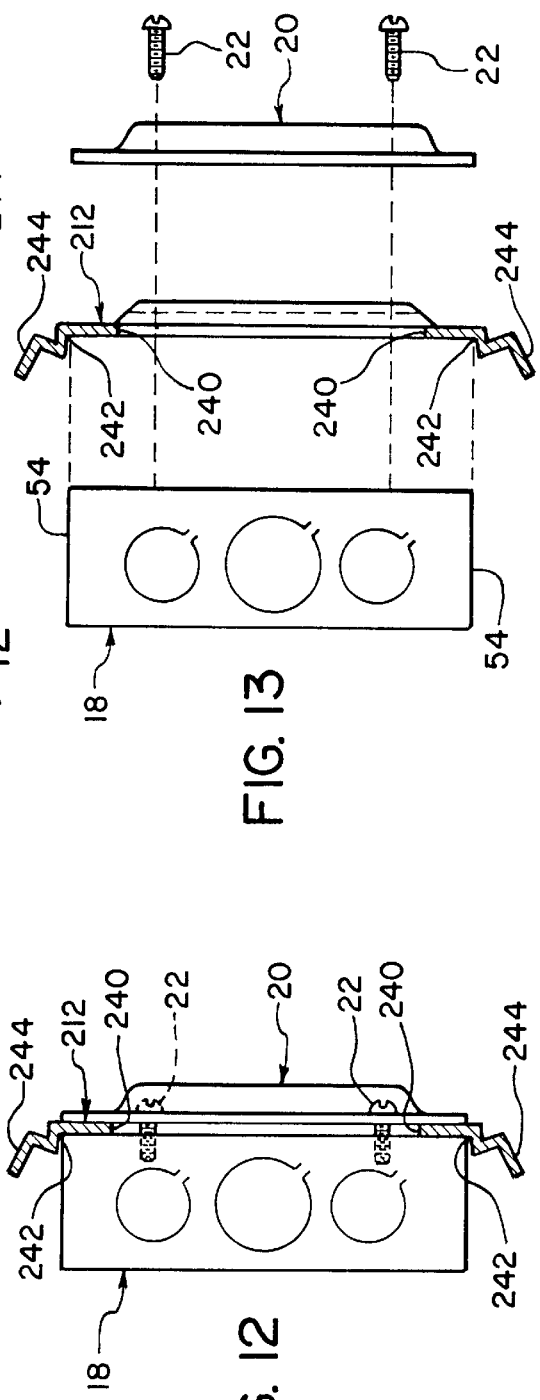

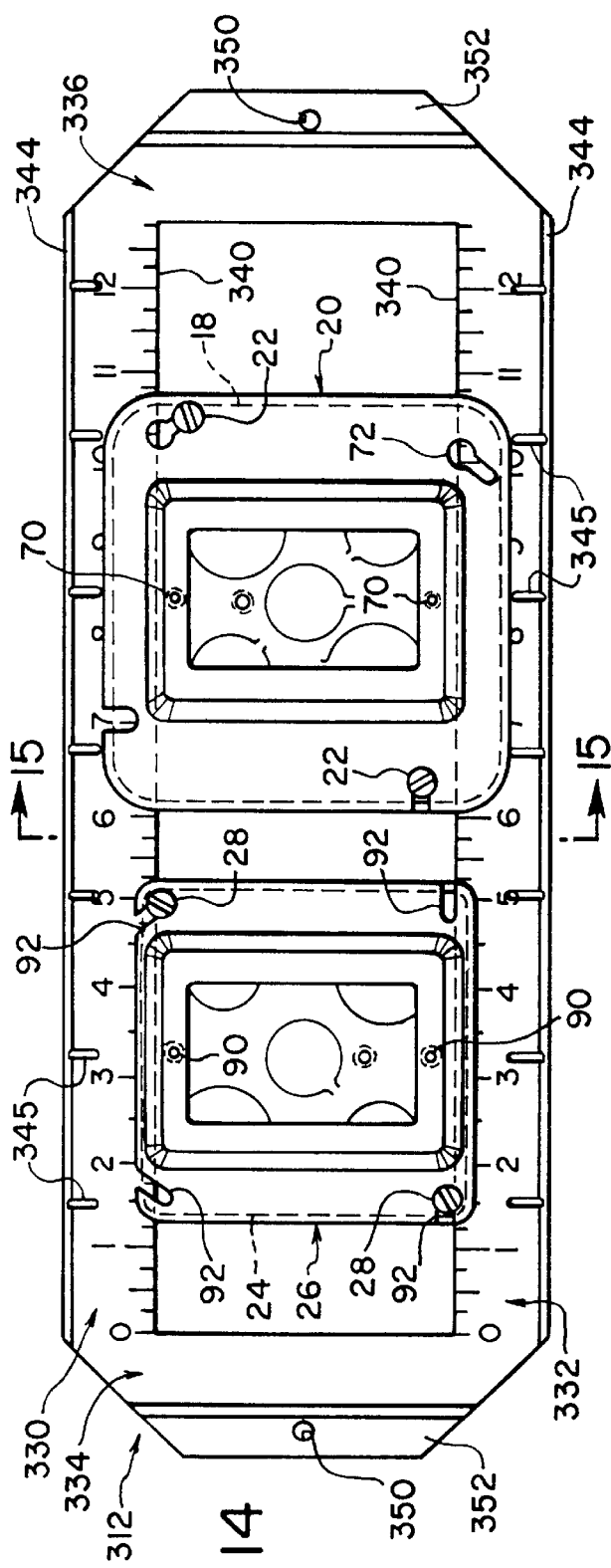

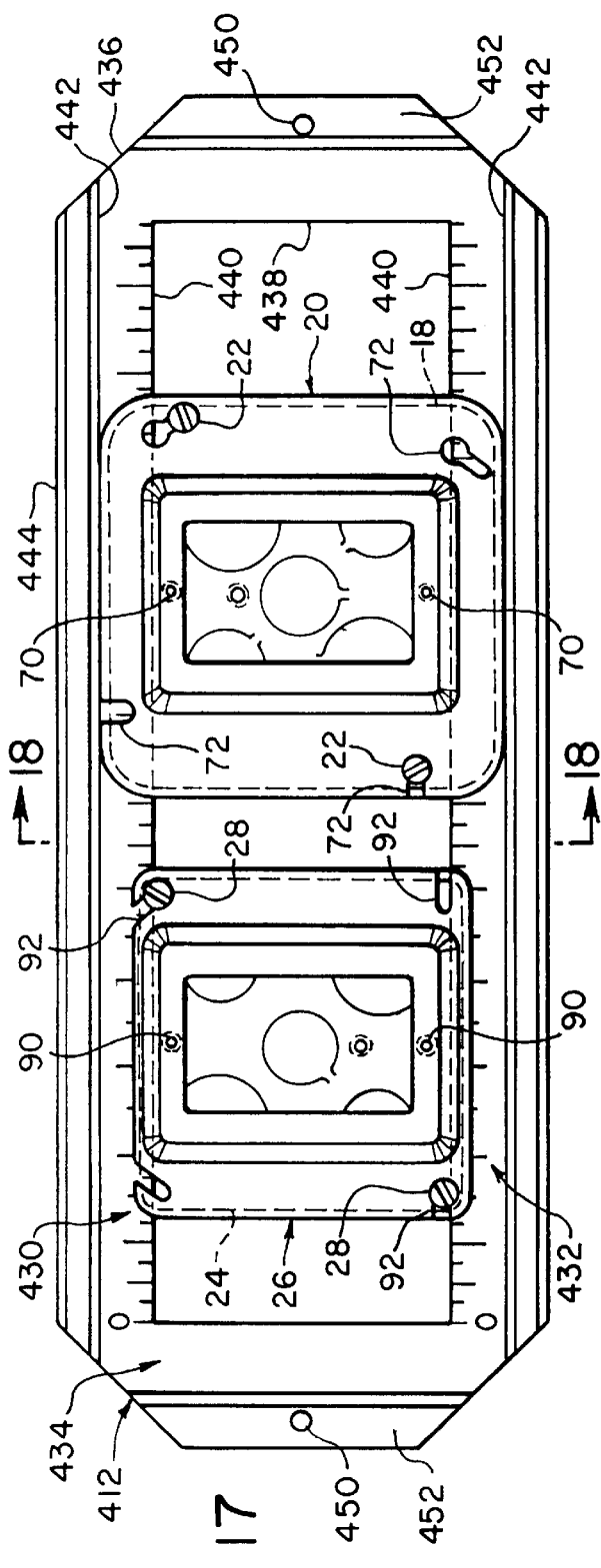
FIG. 17
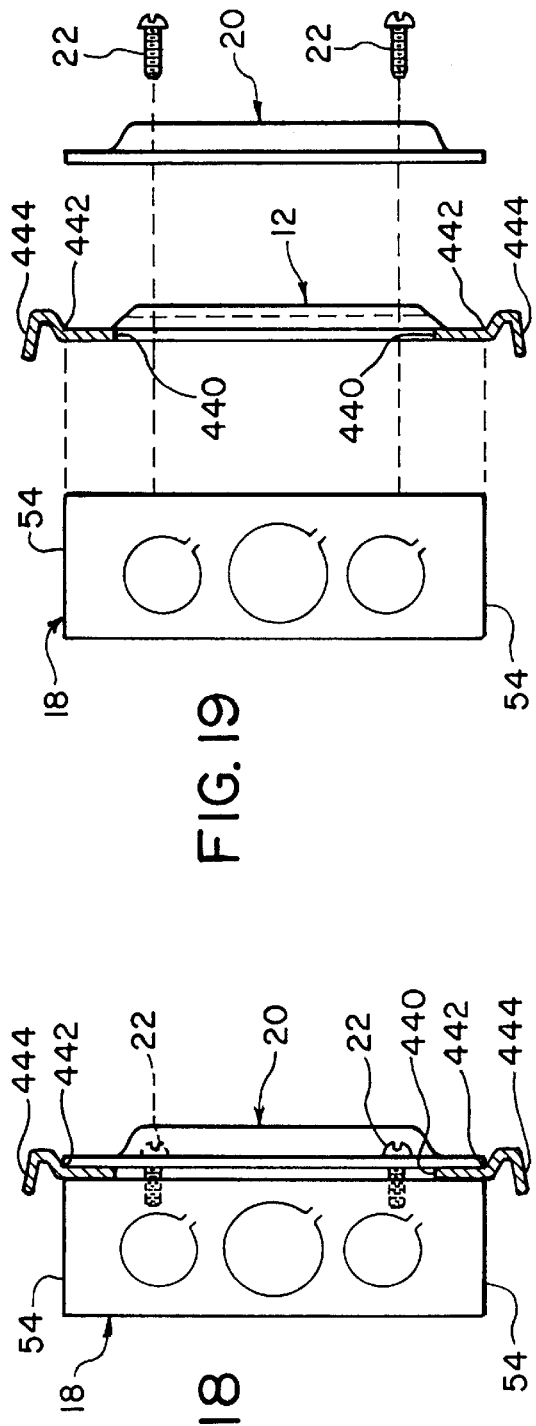
FIG. 19
FIG. 18

5,927,667

ELECTRICAL BOX MOUNTING BRACKET

FIELD OF THE INVENTION

The present invention generally relates to a mounting bracket secured between a pair of studs in a wall for supporting an electrical box therebetween. More specifically, the mounting bracket of the present invention relates to a mounting bracket which is capable of mounting electrical boxes with different depths as well as both 4 inch square boxes and $4^{11}/_{16}$ inch square boxes with limited vertical movement of the electrical box relative to the mounting bracket.

BACKGROUND OF THE INVENTION

Presently, there are many types of mounting brackets available on the market for mounting electrical boxes to wall studs. Many of the mounting brackets are designed to be mounted to a single wall stud for supporting a single electrical box. While these mounting brackets work well, they do not provide a wide range of adjustability between wall studs and only support a single electrical box. Accordingly, mounting brackets for supporting a plurality of electrical boxes have been developed which span between a pair of adjacent wall studs to allow the builder to conveniently position the electrical box or boxes between the wall studs.

One example of a prior mounting bracket, which is capable of supporting a wide variety of electrical boxes, is disclosed in U.S. Pat. No. 5,330,137 to Oliva. The mounting bracket of the Oliva patent provides infinite adjustability and can be used with boxes of different depths. Moreover, the mounting bracket of the Oliva patent can be used to either a 4 inch square electrical box or a $4^{11}/_{16}$ inch square electrical box or both. However, one disadvantage of the mounting bracket disclosed in the Oliva patent is that it allows for too much vertical movement of certain sizes of electrical boxes such that one of the mounting screws of a wiring device can bottom out on the mounting bracket and thus cannot be fully threaded into the cover More specifically, the central cutout of the mounting bracket of the Oliva patent is too large such that mounting screws coupling the electrical box and cover together can move vertically within the central cutout of the mounting bracket of the Oliva patent. This movement of the electrical box can cause the threaded hole in the cover for mounting a wiring device to overlap with the mounting bracket such that the mounting screw of the wiring device cannot be fully threaded into the cover.

To avoid this problem, the opening or central cutout of the mounting bracket of the Oliva patent could be designed to prevent vertical movement of either a 4 inch square electrical box or a $4^{11}/_{16}$ inch square electrical box by sizing the central cutout to engage the mounting screws of the electrical box and cover. However, if the central cutout is sized to limit vertical movement of either the 4 inch square electrical box or the $4^{11}/_{16}$ inch square electrical box, then the central cutout will not be correctly sized to accommodate the other mentioned electrical box to prevent vertical movement relative thereto.

Accordingly, there exists a need for a mounting bracket which has all of the advantages of the electrical mounting bracket disclosed in the Oliva patent as well as the ability to mount both 4 inch square electrical boxes and $4^{11}/_{16}$ inch square electrical boxes such that the electrical box mounting bracket will substantially prevent relative movement of both types of electrical boxes mounted thereto.

This invention addresses these problems in the art, along with other needs which will become apparent to those skilled in the art once given this disclosure.

SUMMARY OF THE INVENTION

One object of the present invention is to provide a mounting bracket which is capable of mounting both 4 inch square electrical boxes and $4^{11}/_{16}$ inch square electrical boxes between a pair of adjacent wall studs such that vertical movement between the mounting bracket and the electrical box mounted thereto is limited, while horizontal movement is virtually unlimited.

Another object of the present invention is to provide an electrical mounting bracket which can accommodate electrical boxes having different depths.

Another object of the present invention is to provide a mounting bracket which is relatively easy and inexpensive to manufacture.

Another object of the present invention is to provide a mounting bracket which is relatively easy to install.

The foregoing objects are basically attained by providing a mounting bracket for selectively mounting both 4 inch square electrical boxes and $4^{11}/_{16}$ inch square electrical boxes thereto and for attachment between first and second adjacent support members, comprising: a top support rail having a front surface, a rear surface, an inner edge and an outer edge, the top support rail being free of mounting apertures for accommodating a fastener, the top support rail further having a top abutment; a bottom support rail having a front surface, a rear surface, an inner edge and an outer edge, the bottom support rail being free of mounting apertures for accommodating a fastener, the bottom support rail further having a bottom abutment; a first mounting end coupled to and extending between first ends of the top and bottom support rails, the first mounting end being adapted to be attached to the first support member; and a second mounting end coupled to and extending between second ends of the top and bottom support rails, the second mounting end being adapted to be attached to the second support member; the top and bottom support rails being spaced apart by the first and second mounting ends to define an elongated central cut-out portion, the inner edges of the top and bottom support rails being spaced apart by a distance which is substantially equal to or slightly greater than the distance between a pair of mounting screws of a 4 inch square electrical box, and the top and bottom abutments being spaced apart by a distance which is substantially equal to or slightly greater than the outer dimension of a $4^{11}/_{16}$ inch square electrical box.

Other objects, advantages and salient features of the invention will become apparent to those skilled in the art from the following detailed description, which, taken in conjunction with the annexed drawings, discloses four preferred embodiments of the present invention.

BRIEF DESCRIPTION OF THE DRAWINGS

Referring now to the drawings which form part of this original disclosure:

FIG. 1 is a top plan view of an electrical box mounting bracket attached between a pair of studs or support members, and with a 4 inch square electrical box and a $4^{11}/_{16}$ inch square electrical box coupled thereto via a pair of covers in accordance with a first embodiment of the present invention;

FIG. 2 is an exploded top plan view of the mounting bracket, the electrical boxes and their associated covers illustrated in FIG. 1, prior to mounting to the studs or support members;

FIG. 3 is a front elevational view of the mounting bracket illustrated in FIGS. 1 and 2, with the electrical boxes and associated covers coupled thereto but with the studs or support members removed for purpose of illustration;

FIG. 4 is a transverse cross-sectional view of the mounting bracket illustrated in FIGS. 1–3, taken along section line 4—4 of FIG. 3, and with the 4$^{11}$⁄$_{16}$ inch square electrical box and its associated cover illustrated in elevation;

FIG. 5 is an exploded transverse cross-sectional view of the mounting bracket illustrated in FIGS. 1–3, and with the 4$^{11}$⁄$_{16}$ inch square electrical box and its associated cover illustrated in elevation;

FIG. 11 is a front elevational view of a mounting bracket in accordance with a second embodiment of the present invention, with a 4 inch square electrical box, a 4$^{11}$⁄$_{16}$ inch square electrical box and their associated covers coupled thereto;

FIG. 12 is a transverse cross-sectional view of the mounting bracket illustrated in FIG. 11, taken along section line 12—12 of FIG. 11, and with the 4$^{11}$⁄$_{16}$ inch square electrical box and its associated cover illustrated in elevation;

FIG. 13 is an exploded transverse cross-sectional view of the mounting bracket illustrated in FIGS. 11 and 12, and with the 4$^{11}$⁄$_{16}$ inch square electrical box and its associated cover illustrated in elevation;

FIG. 14 is a front elevational view of a mounting bracket in accordance with a third embodiment of the present invention, with a 4 inch square electrical box, a 4$^{11}$⁄$_{16}$ inch square electrical box and their associated covers coupled thereto;

FIG. 15 is a transverse cross-sectional view of the mounting bracket illustrated in FIG. 14, taken along section line 15—15 of FIG. 14, and with the 4$^{11}$⁄$_{16}$ inch square electrical box and its associated cover illustrated in elevation;

FIG. 16 is an exploded transverse cross-sectional view of the mounting bracket illustrated in FIGS. 14 and 15, and with the 4$^{11}$⁄$_{16}$ inch square electrical box and its associated cover illustrated in elevation;

FIG. 17 is a front elevational view of a mounting bracket in accordance with a fourth embodiment of the present invention, with a 4 inch square electrical box, a 4$^{11}$⁄$_{16}$ inch square electrical box and their associated covers coupled thereto;

FIG. 18 is a transverse cross-sectional view of the mounting bracket illustrated in FIG. 17 taken along section line 18—18 of FIG. 17, and with the 4$^{11}$⁄$_{16}$ inch square electrical box and its associated cover illustrated in elevation; and FIG. 19 is an exploded transverse cross-sectional view of the mounting bracket illustrated in FIGS. 17 and 18, and with the 4$^{11}$⁄$_{16}$ inch square electrical box and its associated cover illustrated in elevation.

DETAILED DESCRIPTION OF PREFERRED EMBODIMENTS

Figure 7:
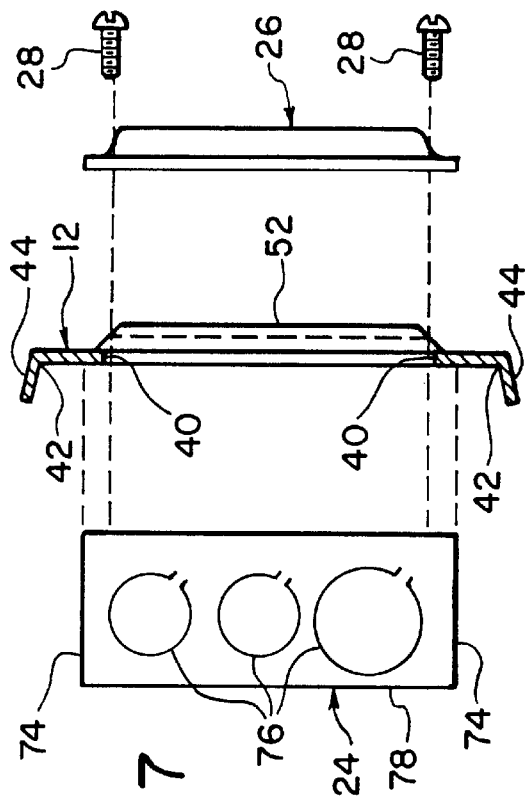
FIG. 7 is an exploded transverse cross-sectional view of the mounting bracket illustrated in FIGS. 1–3, and with the 4 inch square electrical box and its associated cover illustrated in elevation.

Referring initially to FIGS. 1–3, an electrical box mounting assembly 10 is illustrated in accordance with one preferred embodiment of the present invention. Electrical box assembly 10 as illustrated in FIGS. 1–3 basically includes a mounting bracket 12 attached between a pair of wall studs or support members 14 via a pair of fasteners 16, a 4$^{11}$⁄$_{16}$ inch square electrical box 18 coupled to mounting bracket 12 via a 4$^{11}$⁄$_{16}$ inch square cover 20 and screws 22, and a 4 inch square electrical box 24 coupled to mounting bracket 12 via a 4 inch square cover 26 and screws 28. While electrical box mounting assembly 10 is illustrated as including a pair of electrical boxes, it will be apparent to those skilled in the art that electrical box mounting assembly 10 can include only a single electrical box coupled to mounting bracket 12 via its associated cover and screws, or several electrical boxes coupled to mounting bracket 12 via their associated covers and screws. Electrical box mounting assembly 10 is designed to support two different size electrical boxes such that they are not capable of significant vertical movement relative to mounting bracket 12 when mounted thereto. While some clearance space or vertical play between mounting bracket 12 and electrical boxes 18 and 24 are permitted, it is important that this vertical play be minimal such that the screws (not shown) of a wiring device (not shown) will not bottom out on mounting bracket 12. Moreover, electrical box mounting assembly 10 is especially designed to include either one or more 4$^{11}$⁄$_{16}$ inch square electrical boxes and/or one or more 4 inch square electrical boxes as explained below in more detail.

Mounting bracket 12 is preferably constructed as an integral, one-piece, unitary member from a metallic sheet material such as twenty gauge galvanized sheet metal. In any event, mounting bracket 12 is preferably constructed of a relatively rigid, conductive sheet material. Mounting bracket 12 should have sufficient structural strength to span studs 14 and support several electrical boxes thereon. Since studs 14 are typically spaced either sixteen or twenty-four inches apart on center, mounting bracket 12 can be either approximately sixteen or twenty-four inches in length. For purposes of describing the present invention, only a sixteen inch mounting bracket design will be illustrated.

Figure 8:
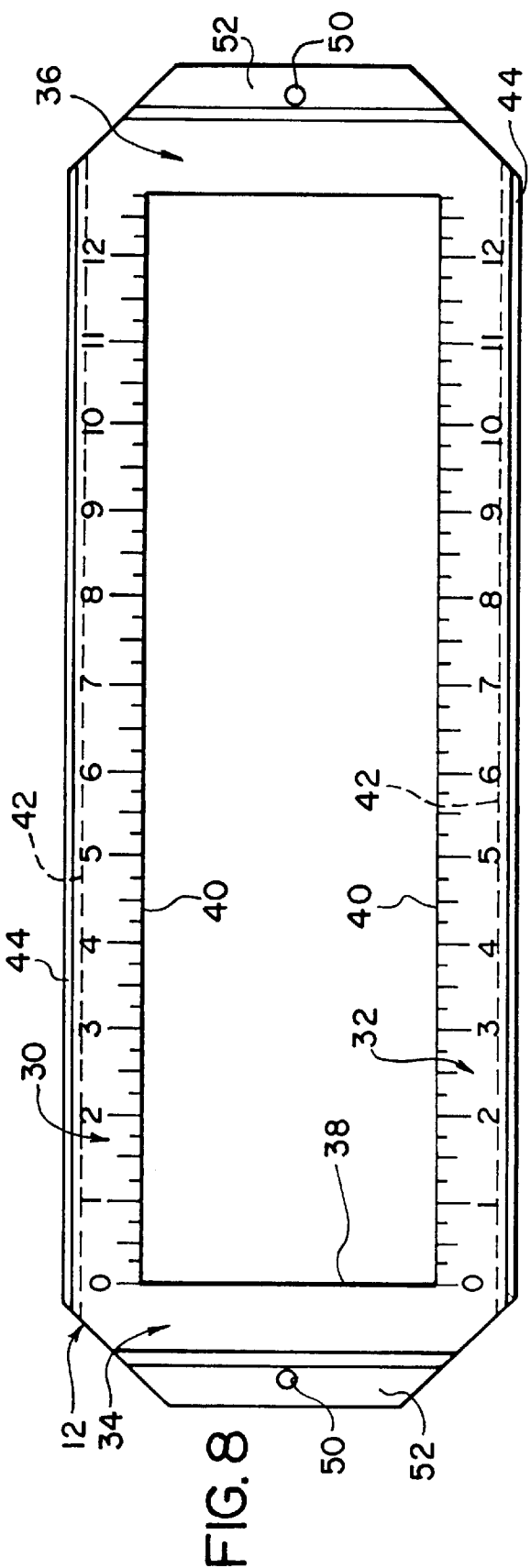
FIG. 8 is a front elevational view of the mounting bracket illustrated in FIGS. 1–7 in accordance with the first embodiment of the present invention.

Referring to FIG. 8, mounting bracket 12 basically includes a top support rail 30, a bottom support rail 32, a first mounting end 34 and a second mounting end 36. An elongated central cut-out portion or opening 38 is defined by support rails 30 and 32 and mounting ends 34 and 36. In other words, first mounting end 34 is coupled to and extends between the first ends of top and bottom support rails 30 and 32, while second mounting end 36 is coupled to and extends between the second ends of top and bottom support rails 30 and 32 so as to define central cut-out portion or opening 38.

Top and bottom support rails 30 and 32 are substantially mirror images of each other, except for the indicia stamped thereon. Specifically, top and bottom support rails 30 and 32 each includes a substantially straight inner edge 40 and a substantially straight outer edge 42. Inner and outer edges 40 and 42 are all preferably substantially parallel to each other and substantially perpendicular to mounting ends 34 and 36. In this embodiment, outer edges 42 of top and bottom support rails 30 and 32 each includes a rearwardly extending abutment flange 44. As seen in FIGS. 4 and 5, flanges 44 provide additional rigidity to mounting bracket 12 as well as limit vertical movement of 4 11/16 inch square electrical box 18 relative to mounting bracket 12.

Figure 6:
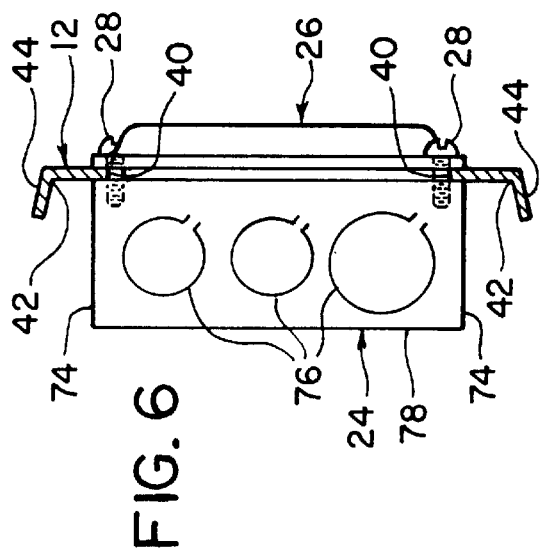
FIG. 6 is a transverse cross-sectional view of the mounting bracket illustrated in FIGS. 1–3, taken along section line 6—6 of FIG. 3, and with the 4 inch square electrical box and its associated cover illustrated in elevation and the 4$^{11}$⁄$_{16}$ inch square electrical box removed for clarity.

As seen in FIGS. 6 and 7, inner edges 40 of top and bottom support rails 30 and 32 are spaced preferably about 3 9/16 inches apart such that the shafts of screws 28 of the 4 inch square electrical box 24 substantially engages inner edges 40 of top and bottom support rails 30 and 32 so that the 4 inch square electrical box 24 cannot be substantially moved up or down relative to mounting bracket 12. Of course, it will be apparent to those skilled in the art that a small amount of clearance should be provided between inner edges 40 of support rails 30 and 32 and screws 28 of the 4 inch square electrical box 24. However, the clearance should not be too large so as to allow the screws (not shown) of the wiring device (not shown) which is to be attached to cover 26 to bottom out on either support rail 30 or 32.

Outer edges 42 of top and bottom support rails 30 and 32 are preferably spaced about 4 11/16 inches to about 4 13/16 inches apart such that the rearwardly extending abutment flanges 44 will engage the outer periphery of the 4 11/16 inch square electrical box 18 to substantially prevent or limit up or down vertical movement of the 4 11/16 inch square electrical box 18 relative to mounting bracket 12. In other words, abutment flanges 44 are designed to engage the outer periphery of the 4 11/16 inch square box 18 to limit or prevent vertical movement relative to mounting bracket 12. Preferably, the dimension between outer edges 42 of rails 30 and 32 can be slightly larger than the dimension of the 4 11/16 inch square electrical box 18 to provide for dimensional irregularities in the parts of electrical mounting box assembly 10. In any event, the dimension between flanges 44 should not allow too much vertical movement of the 4 11/16 inch square electrical box 18 such that the screws (not shown) of the wiring device (not shown) mounted to cover 20 will bottom out on either support rail 30 or 32.

Preferably, abutment flanges 44 are continuous flanges which are integrally formed with its associated support rails 30 and 32. As seen in FIGS. 4 and 5, abutment flanges 44 are angled slightly outwardly from rails 30 and 32 to allow for easy insertion of the 4 11/16 inch square electrical box 18 therebetween. Preferably, abutment flanges 44 form an angle of about ten degrees with its associated rail 30 or 32.

As seen in FIGS. 1–3, first and second mounting ends 34 and 36 are preferably substantially mirror images of each other, and each includes a hole 50 for receiving a fastener 16 therethrough for attaching mounting bracket 12 to wall studs or support members 14. Fastener 16 can be any type of conventional fastener such as a screw or a nail as needed and/or desired.

Preferably, each of the mounting ends 34 and 36 are bent to form a substantially flat attachment portion 52 which lies in a different plane from the top and bottom support rails 30 and 32. Preferably, attachment portions 52 are elevated from top and bottom support rails 30 and 32 and substantially parallel thereto. The distance by which the attachment portions 52 are raised from top and bottom support rails 30 and 32 is determined by the thickness of covers 20 and/or 26 as well as their attachment screws 22 and/or 28. Typically, attachment portions 52 are offset from top and bottom support rails 30 and 32 by about 1/4 inch.

The corners of first and second mounting ends 34 and 36 are preferably removed to minimize the amount of material of mounting bracket 12 as well as to avoid covering up studs or support members 14. Thus, the removal of the corner portions allow fasteners such as nails to be easily driven into the locations where the corners of first and second mounting ends 34 and 36 otherwise would have been.

Figure 9:
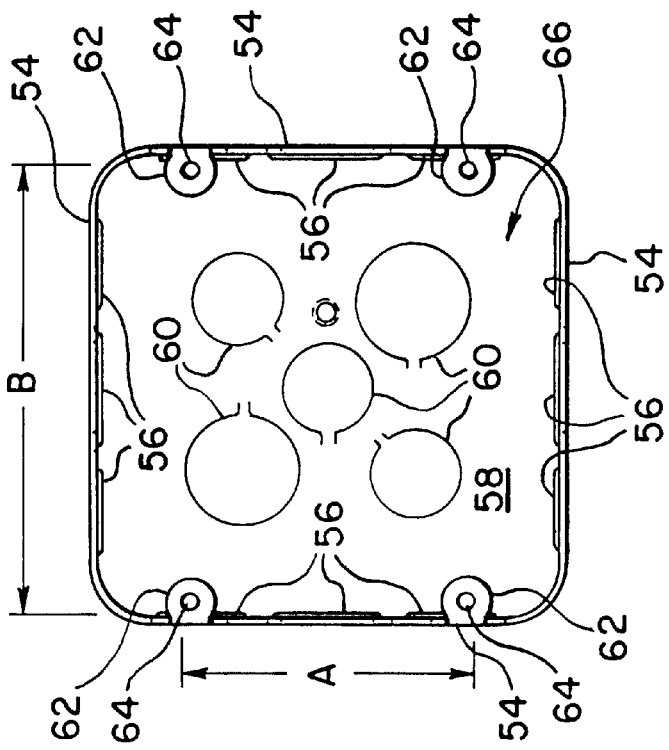
FIG. 9 is a front plan view of a conventional 4$^{11}$⁄$_{16}$ inch square electrical box which can be used with the mounting bracket in accordance with the present invention.

As seen in FIG. 9, the 4 11/16 inch square electrical box 18 is a substantially conventional electrical box of standard construction, and thus, electrical box 18 will not be discussed or illustrated in detail herein. Rather, electrical box 18 will only be discussed sufficient for one of ordinary skill in the art to understand the present invention.

The 4 11/16 inch square electrical box 18 typically has four substantially planar sidewalls 54 with knock-out portions 56 and a rear wall 58 with knock-out portions 60. Two of the opposed sidewalls 54 are provided with a pair of mounting ears 62 which have threaded mounting holes 64 for receiving screws 22 therein. The vertical distance A between the outer vertical edges of mounting holes 64 is approximately 2 29/32 inches, while the horizontal distance B between the outer horizontal edges of mounting holes 64 is approximately 4 13/32 inches. Clearly, the 4 11/16 inch square electrical box 18 can only be mounted vertically as shown in FIG. 9, since the vertical dimension of central cutout 38 is about 3 9/16 inches in height. The depth of the 4 11/16 inch square electrical box 18 is typically either 1 1/2 inches deep or 2 1/8 inches deep. Electrical box 18 has an outer height and width of about 4 11/16 inches. Sidewalls 54 define a substantially square front opening 66 for receiving a wiring device (not shown) therein.

As seen in FIG. 3, the associated cover 20 for the 4 11/16 inch square electrical box 18 is also preferably a conventional member of standard construction, and thus, will not be discussed or illustrated in detail herein. Rather, cover 20 will only be discussed such that one of ordinary skill in the art can understand the present invention.

Cover 20 is preferably constructed of a metallic sheet material such as a stamped galvanized sheet metal. The cover 20 has a central opening 68 for accommodating a wiring device, a pair of threaded holes 70 for fixedly coupling a wiring device (not shown) thereto via screws (not shown), and four mounting slots 72 for receiving screws 22 to couple cover 20 to the 4 11/16 inch square electrical box 18. The outer edges of threaded holes 70 are spaced approximately 3 7/16 inches apart. Slots 72 are located such that at least two of slots 72 are aligned with at least two of the threaded mounting holes 64 in the mounting ears 62 of the 4 11/16 inch square electrical box 18. In other words, screws 22 are inserted through two of the slots 72 and threaded into two of the threaded holes 64 of the 4 11/16 inch square electrical box 18 to fasten cover 20 thereto. The central opening 68 allows access to the interior of the 4 11/16 inch square electrical box 18 after cover 20 is fastened thereto.

Figure 10:
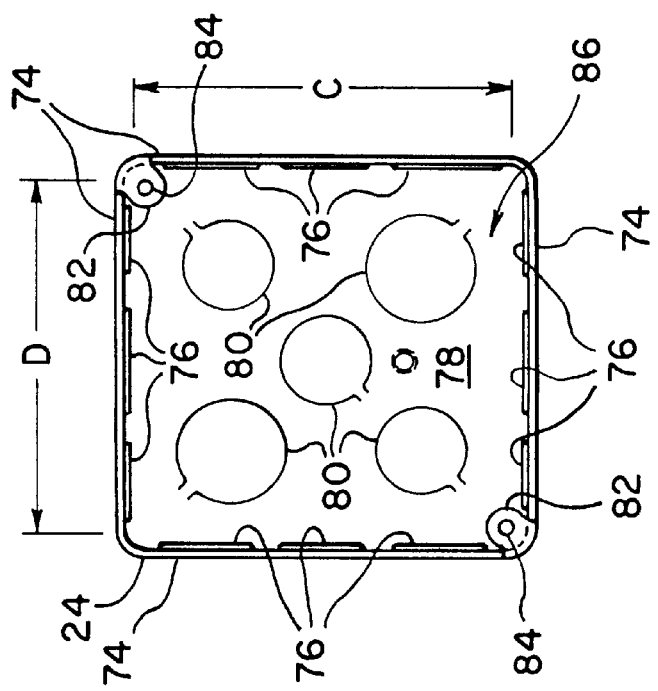
FIG. 10 is a front plan view of a conventional 4 inch square electrical box which can be used with the mounting bracket in accordance with the present invention.

As seen in FIG. 10, the 4 inch square electrical box 24 is a substantially conventional electrical box of standard construction, and thus, electrical box 24 will not be discussed or illustrated in detail herein. Rather, electrical box 24 will only be discussed sufficient for one of ordinary skill in the art to understand the present invention.

The 4 inch square electrical box 24 typically has four substantially planar sidewalls 74 with knock-out portions 76 and a rear wall 78 with knock-out portions 80. Two of the opposed sidewalls 74 are provided with a mounting ear 82 which has threaded mounting hole 84 for receiving screws 28 therein.

The vertical distance C between the outer vertical edges of mounting holes 64 is approximately 3 17/32 inches. Likewise, the horizontal distance D between the outer horizontal edges of mounting holes 84 is also approximately 3 17/32 inches. Clearly, the 4 inch square electrical box 24 can only be mounted either vertically or horizontally since the vertical dimension of central cutout 38 is about 3 9/16 inches in height. The depth of the 4 inch square electrical box 24 is typically either 1 1/2 inches deep or 2 1/8 inches deep. Electrical box 24 has an outer height and width of about 4 inches. Sidewalls 74 define a substantially square front opening 86 for receiving a wiring device (not shown) therein.

As seen in FIG. 3, the associated cover 26 for the 4 inch square electrical box 24 is also preferably a conventional member of standard construction, and thus, will not be discussed or illustrated in detail herein. Rather, cover 26 will only be discussed such that one of ordinary skill in the art can understand the present invention.

Cover 26 is preferably constructed of a metallic sheet material such as a stamped galvanized sheet metal. The cover 26 has a central opening 88 for accommodating a wiring device, a pair of threaded holes 90 for fixedly coupling a wiring device (not shown) thereto via screws (not shown), and four mounting slots 92 for receiving screws 28 to couple cover 26 to the 4 inch square electrical box 24. The outer edges of threaded holes 90 are spaced approximately 3 7/16 inches apart. Slots 92 are located such that at least two of slots 72 are aligned with at least two of the threaded mounting holes 84 in the mounting ears 82 of the 4 inch square electrical box 24. In other words, screws 28 are inserted through slots 92 and threaded into the threaded holes 84 of the 4 inch square electrical box 24 to fasten cover 26 thereto. The central opening 88 allows access to the interior of the 4 inch square electrical box 24 after cover 26 is fastened thereto.

Installation of Electrical Box Mounting Assembly 10

Electrical box mounting assembly 10 is coupled to support members 14 by first placing mounting bracket 12 on a pair of adjacent support members 14 such that attachment portions 52 engage the front face of support members 14. Then, fasteners 16 are inserted through holes 50 to fixedly secure mounting bracket 12 to support members 14. As attached, the front face of mounting bracket 12 is substantially flush with the front plane of the support members 14.

After the mounting bracket 12 is secured, one of the electrical boxes 18 or 24 is placed against the rear surface of mounting bracket 12 with its front opening 66 or 86 engaging the rear surface of top and bottom support rails 30 and 32. In the case of the 4 11/16 inch square electrical box 18, the upper and bottom sidewalls 54 are substantially adjacent or engage abutment flanges 44 to limit or prevent vertical movement of electrical box 18 relative to mounting bracket 12. In the case of the 4 inch square electrical box 24, the threaded mounting holes 84 in the mounting ears 82 are positioned substantially adjacent but slightly spaced inwardly from the inner edges 40 of the top and bottom support rails 30 and 32 such that mounting screws 28 engage inner edges 40 of support rails 30 and 32 to limit or prevent vertical movement of electrical box 24 relative to mounting bracket 12.

Next, the associated cover 20 or 26 is placed against the front surface of the top and bottom support rails 30 and 32 such that the cover 20 or 26 is opposite electrical boxes 18 or 24, respectively. In this position, either slots 72 of cover 20 are aligned with holes 64 of electrical box 18 or the slots 92 of cover 26 are aligned with the holes 84 of electrical box 24. Now, the screws 22 or 28 are threaded into the holes 64 or 84 of the mounting ears 62 or 82 to fasten cover 20 or 26 to electrical box 18 or 24.

In either case, screws 22 of electrical box 18 and screws 28 of electrical box 24 both extend through central cutout 38 such that electrical boxes 18 and 24 can be positioned anywhere along the length of central cutout 38. In other words, screws 22 and 28 do not go through either the top or bottom support rails 30 or 32 of mounting bracket 12, but instead pass through the central cutout 38 of mounting bracket 12. This obviates any need to provide holes in either of the top or bottom rails 30 or 32. Thus, the positioning of electrical boxes 18 and 24 are not constrained by holes in the top or bottom rails 30 or 32.

It will be apparent to those skilled in the art that additional electrical boxes may be mounted onto mounting bracket 12 by repeating the above-mentioned steps for each electrical box. Moreover, it will be apparent to those skilled in the art that any combination of electrical boxes of different depths and sizes can be mounted to mounting bracket 12 within the constraints of the length of the central cutout 38.

Electrical Box Mounting Assembly 210

Referring now to FIGS. 11–13, an electrical box mounting assembly 210 in accordance with a second embodiment of the present invention is illustrated. Electrical box assembly 210 is similar in construction to electrical box assembly 10, discussed above, except that top and bottom support rails 30 and 32 of mounting bracket 12 has been modified in electrical box assembly 210. Thus, electrical box mounting assembly 210 will not be discussed or illustrated in detail herein.

Electrical box assembly 210 basically includes a mounting bracket 212 attached between a pair of wall studs or support members via a pair of fasteners in the same manner as discussed above in the first embodiment. The electrical box assembly 210 also includes the 4 11/16 inch square electrical box 18, the 4 11/16 inch square cover 20 and screws 22, all discussed above, as well as the 4 inch square electrical box 24, the 4 inch square cover 26 and screws 28 also, all discussed above. While electrical box mounting assembly 210 is illustrated as including a pair of electrical boxes, it will be apparent to those skilled in the art that electrical box mounting assembly 210 can include only a single electrical box coupled to mounting bracket 212 via its associated cover and screws, or several electrical boxes coupled to mounting bracket 212 via their associated covers and screws.

Electrical box mounting assembly 210 is designed to support two different size electrical boxes such that they are not capable of significant vertical movement relative to mounting bracket 212 when mounted thereto. While some clearance space or vertical play between mounting bracket 212 and electrical boxes 18 and 24 are permitted, it is important that this vertical play be minimal such that the screws (not shown) of a wiring device (not shown) will not bottom out on mounting bracket 212. Moreover, similar to the first embodiment, electrical box mounting assembly 210 is especially designed to include either one or more 4 11/16 inch square electrical boxes and/or one or more 4 inch square electrical boxes as explained above in more detail in reference to the first embodiment.

Mounting bracket 212 is preferably constructed as an integral, one-piece, unitary member from a metallic sheet material such as twenty gauge galvanized sheet metal. In any event, mounting bracket 212 is preferably constructed of a relatively rigid, conductive sheet material. Mounting bracket 212 should have sufficient structural strength to span a pair of wall studs and support several electrical boxes thereon. Since wall studs are typically spaced either sixteen or twenty-four inches apart on center, mounting bracket 212 can be either approximately sixteen or twenty-four inches in length. For purposes of describing the present invention, only a sixteen inch mounting bracket design will be illustrated.

Referring to FIG. 11, mounting bracket 212 basically includes a top support rail 230, a bottom support rail 232, a first mounting end 234 and a second mounting end 236. An elongated central cut-out portion or opening 238 is defined by support rails 230 and 232 and mounting ends 234 and 236. In other words, first mounting end 234 is coupled to and extends between the first ends of top and bottom support rails 230 and 232, while second mounting end 236 is coupled to and extends between the second ends of top and bottom support rails 230 and 232 so as to define central cutout portion or opening 238.

Top and bottom support rails 230 and 232 each includes a substantially straight inner edge 240 and a substantially straight outer edge 242. Inner and outer edges 240 and 242 are all preferably substantially parallel to each other and substantially perpendicular to mounting ends 234 and 236. In this embodiment, outer edges 242 of top and bottom support rails 230 and 232 each includes a rearwardly extending abutment flange 244. As seen in FIGS. 12 and 13, flanges 244 are substantially Z-shaped in transverse cross-section and provide additional rigidity to mounting bracket 212 as well as limit vertical movement of $4^{11}/_{16}$ inch square electrical box 18 relative to mounting bracket 212.

As seen in FIG. 11, inner edges 240 of top and bottom support rails 230 and 232 are spaced preferably about $3^{9}/_{16}$ inches apart such that the shafts of screws 28 of the 4 inch square electrical box 24 substantially engages inner edges 240 of top and bottom support rails 230 and 232 so that the 4 inch square electrical box 24 cannot be substantially moved up or down relative to mounting bracket 212. Of course, it will be apparent to those skilled in the art that a small amount of clearance should be provided between inner edges 240 of support rails 230 and 232 and screws 28 of the 4 inch square electrical box 24. However, the clearance should not be too large so as to allow the screws (not shown) of the wiring device (not shown) which is to be attached to cover 26 via holes 90 to bottom out on either support rail 230 or 232.

Outer edges 242 of top and bottom support rails 230 and 232 are preferably spaced about $4^{11}/_{16}$ inches to $4^{13}/_{16}$ inches apart such that the first portion of the rearwardly extending abutment flanges 244 can engage the outer periphery of the $4^{11}/_{16}$ inch square electrical box 18 to substantially prevent or limit up or down vertical movement of the $4^{11}/_{16}$ inch square electrical box 18 relative to mounting bracket 212. In other words, the first part of the Z-shaped abutment flanges 244 are designed to engage the outer periphery of the $4^{11}/_{16}$ inch square box 18 to limit or prevent vertical movement relative to mounting bracket 212. Preferably, the dimension between outer edges 242 of rails 230 and 232 can be slightly larger than the dimension of the $4^{11}/_{16}$ inch square electrical box 18 to provide for dimensional irregularities in the parts of electrical mounting box assembly 210. In any event, the dimension between flanges 244 should not allow too much vertical movement of the $4^{11}/_{16}$ inch square electrical box 18 such that the screws (not shown) of the wiring device (not shown) which is to be mounted to cover 20 via holes 70 will bottom out on either support rail 230 or 232.

Preferably, abutment flanges 244 are continuous flanges which are integrally formed with its associated support rails 230 and 232. As seen in FIGS. 12 and 13, abutment flanges 44 are angled slightly outwardly from rails 230 and 232 to allow for easy insertion of the $4^{11}/_{16}$ inch square electrical box 18 therebetween. Preferably, abutment flanges 244 are angled about ten degrees to permit stacking of mounting bracket 212 with other similarly constructed mounting brackets.

First and second mounting ends 234 and 236 are preferably substantially mirror images of each other, and each includes a hole 250 for receiving a fastener (not shown) therethrough for attaching mounting bracket 212 to a pair of wall studs or support members (not shown). Any type of conventional fastener can be used, such as a screw or a nail.

Preferably, each of the mounting ends 234 and 236 are bent to form a substantially flat attachment portion 252 which lies in a different plane from the top and bottom support rails 230 and 232. Preferably, attachment portions 252 are elevated from top and bottom support rails 230 and 232 and substantially parallel thereto. The distance by which the attachment portions 252 are raised from top and bottom support rails 230 and 232 is determined by the thickness of covers 20 and/or 26 as well as their attachment screws 22 and/or 28. Typically, attachment portions 252 are offset from top and bottom support rails 230 and 232 by about ¼ inch.

Electrical Box Mounting Assembly 310

Referring now to FIGS. 14–16, an electrical box mounting assembly 310 in accordance with a third embodiment of the present invention is illustrated. Electrical box assembly 310 is similar in construction to electrical box assembly 10, discussed above, except that top and bottom support rails 30 and 32 of mounting bracket 12 has been modified in electrical box assembly 310. Thus, electrical box mounting assembly 310 will not be discussed or illustrated in detail herein.

Electrical box assembly 310 basically includes a mounting bracket 312 attached between a pair of wall studs or support members in the same manner as discussed above in the first embodiment via a pair of fasteners. The electrical box assembly 310 also includes the $4^{11}/_{16}$ inch square electrical box 18, the $4^{11}/_{16}$ inch square cover 20 and screws 22, all discussed above, as well as the 4 inch square electrical box 24, the 4 inch square cover 26 and screws 28, all discussed above. While electrical box mounting assembly 310 is illustrated as including a pair of electrical boxes, it will be apparent to those skilled in the art that electrical box mounting assembly 310 can include only a single electrical box coupled to mounting bracket 312 via its associated cover and screws, or several electrical boxes coupled to mounting bracket 312 via their associated covers and screws.

Electrical box mounting assembly 310 is designed to support two different size electrical boxes such that they are not capable of significant vertical movement relative to mounting bracket 312 when mounted thereto. While some clearance space or vertical play between mounting bracket 312 and electrical boxes 18 and 24 are permitted, it is important that this vertical play be minimal such that the screws (not shown) of a wiring device (not shown) will not bottom out on mounting bracket 312. Moreover, similar to the first embodiment, electrical box mounting assembly 310 is especially designed to include either one or more $4^{11}/_{16}$ inch square electrical boxes and/or one or more 4 inch square electrical boxes as explained above in more detail in reference to the first embodiment.

Mounting bracket 312 is preferably constructed as an integral, one-piece, unitary member from a metallic sheet material such as twenty gauge galvanized sheet metal. In any event, mounting bracket 312 is preferably constructed of a relatively rigid, conductive sheet material. Mounting bracket 312 should have sufficient structural strength to span a pair of wall studs and support several electrical boxes thereon. Since wall studs are typically spaced either sixteen or twenty-four inches apart on center, mounting bracket 312 can be either approximately sixteen or twenty-four inches in length. For purposes of describing the present invention, only a sixteen inch mounting bracket design will be illustrated.

Referring to FIG. 14, mounting bracket 312 basically includes a top support rail 330, a bottom support rail 332, a first mounting end 334 and a second mounting end 336. An elongated central cut-out portion or opening 338 is defined by support rails 330 and 332 and mounting ends 334 and 336. In other words, first mounting end 334 is coupled to and extends between the first ends of top and bottom support rails 330 and 332, while second mounting end 336 is coupled to and extends between the second ends of top and bottom support rails 330 and 332 so as to define central cutout portion or opening 338.

Top and bottom support rails 330 and 332 each includes a substantially straight inner edge 340 and a substantially straight outer edge 342. Inner and outer edges 340 and 342 are all preferably substantially parallel to each other and substantially perpendicular to mounting ends 334 and 336. In this embodiment, outer edges 342 of top and bottom support rails 330 and 332 each includes a rearwardly extending flange 344 and a plurality of indentations or abutments 345 stamped into support rails 330 and 332. In other words, abutments 345 are top and bottom protrusions which limit the vertical movement of a $4^{11}/_{16}$ inch square electrical box relative to mounting bracket 318.

As seen in FIGS. 15 and 16, flanges 344 provide additional rigidity to mounting bracket 312, while abutments 345 limit vertical movement of $4^{11}/_{16}$ inch square electrical box 18 relative to mounting bracket 312. More specifically, abutments 345 are vertically spaced about $4^{11}/_{16}$ to about $4^{13}/_{16}$ inches apart at their inner ends to prevent or limit vertical movement of the $4^{11}/_{16}$ inch square electrical box 18. Abutments 345 are also horizontally spaced about $1\frac{3}{4}$ inches apart so that at least two abutments 345 engage both the top and bottom sidewalls of electrical box 18 regardless of its position in central cutout 338.

As seen in FIG. 14, inner edges 340 of top and bottom support rails 330 and 332 are spaced preferably about $3\frac{9}{16}$ inches apart such that the shafts of screws 28 of the 4 inch square electrical box 24 substantially engages inner edges 340 of top and bottom support rails 330 and 332 so that the 4 inch square electrical box 24 cannot be substantially moved up or down relative to mounting bracket 312. Of course, it will be apparent to those skilled in the art that a small amount of clearance should be provided between inner edges 340 of support rails 330 and 332 and screws 28 of the 4 inch square electrical box 24. However, the clearance should not be too large so as to allow the screws (not shown) of the wiring device (not shown) which is to be attached to cover 26 to bottom out on either support rail 330 or 332.

In other words abutments 345 will engage the outer periphery of the $4^{11}/_{16}$ inch square electrical box 18 to substantially prevent or limit up or down vertical movement of the $4^{11}/_{16}$ inch square electrical box 18 relative to mounting bracket 312. Preferably, the dimension between the inner edges of the top and bottom sets of abutments 345 can be slightly larger than the dimension of the $4^{11}/_{16}$ inch square electrical box 18 to provide for dimensional irregularities in the parts of electrical mounting box assembly 310. In any event, the dimension between abutment 345 should not allow too much vertical movement of the $4^{11}/_{16}$ inch square electrical box 18 such that the screws (not shown) of the wiring device (not shown) which is to be mounted to cover 20 via holes 70 will bottom out on either support rail 330 or 332.

First and second mounting ends 334 and 336 are preferably substantially mirror images of each other, and each includes a hole 350 for receiving a fastener therethrough for attaching mounting bracket 312 to wall studs or support members. Any type of conventional fastener can be utilized such as a screw or a nail.

Preferably, each of the mounting ends 334 and 336 are bent to form a substantially flat attachment portion 352 which lies in a different plane from the top and bottom support rails 330 and 332. Preferably, attachment portions 352 are elevated from top and bottom support rails 330 and 332 and substantially parallel thereto. The distance by which the attachment portions 352 are raised from top and bottom support rails 330 and 332 is determined by the thickness of covers 20 and/or 26 as well as their attachment screws 22 and/or 28. Typically, attachment portions 352 are offset from top and bottom support rails 330 and 332 by about $\frac{1}{4}$ inch.

Electrical Box Mounting Assembly 410

Referring now to FIGS. 17–19, an electrical box mounting assembly 410 in accordance with a fourth embodiment of the present invention is illustrated. Electrical box assembly 410 is similar in construction to electrical box assembly 10, discussed above, except that top and bottom support rails 30 and 32 of mounting bracket 12 has been modified in electrical box assembly 410. Thus, electrical box mounting assembly 410 will not be discussed or illustrated in detail herein.

Electrical box assembly 410 basically includes a mounting bracket 412 attached between a pair of wall studs or support members via a pair of fasteners in the same manner as discussed above in the first embodiment. The electrical box assembly 410 also includes the $4^{11}/_{16}$ inch square electrical box 18, the $4^{11}/_{16}$ inch square cover 20 and screws 22, all discussed above, as well as the 4 inch square electrical box 24, the 4 inch square cover 26 and screws 28, all discussed above. While electrical box mounting assembly 410 is illustrated as including a pair of electrical boxes, it will be apparent to those skilled in the art that electrical box mounting assembly 410 can include only a single electrical box coupled to mounting bracket 412 via its associated cover and screws, or several electrical boxes coupled to mounting bracket 412 via their associated covers and screws.

Electrical box mounting assembly 410 is designed to support two different size electrical boxes such that they are not capable of significant vertical movement relative to mounting bracket 412 when mounted thereto. While some clearance space or vertical play between mounting bracket 412 and electrical boxes 18 and 24 are permitted, it is important that this vertical play be minimal such that the screws (not shown) of a wiring device (not shown) will not bottom out on mounting bracket 412. Moreover, similar to the first embodiment, electrical box mounting assembly 410 is especially designed to include either one or more $4^{11}/_{16}$ inch square electrical boxes and/or one or more 4 inch square electrical boxes as explained above in more detail in reference to the first embodiment.

Mounting bracket 412 is preferably constructed as an integral, one-piece, unitary member from a metallic sheet material such as twenty gauge galvanized sheet metal. In any event, mounting bracket 412 is preferably constructed of a relatively rigid, conductive sheet material. Mounting bracket 412 should have sufficient structural strength to span a pair of wall studs and support several electrical boxes thereon. Since wall studs are typically spaced either sixteen or twenty-four inches apart on center, mounting bracket 412 can be either approximately sixteen or twenty-four inches in length. For purposes of describing the present invention, only a sixteen inch mounting bracket design will be illustrated.

Referring to FIG. 17, mounting bracket 412 basically includes a top support rail 430, a bottom support rail 432, a first mounting end 434 and a second mounting end 436. An elongated central cut-out portion or opening 438 is defined by support rails 430 and 432 and mounting ends 434 and 436. In other words, first mounting end 434 is coupled to and extends between the first ends of top and bottom support rails 430 and 432, while second mounting end 436 is coupled to and extends between the second ends of top and bottom support rails 430 and 432 so as to define central cutout portion or opening 438.

Top and bottom support rails 430 and 432 are substantially mirror images of each other, except for the indicia stamped thereon. Specifically, top and bottom support rails 430 and 432 each includes a substantially straight inner edge 440 and a substantially straight outer edge 442. Inner and outer edges 440 and 442 are all preferably substantially parallel to each other and substantially perpendicular to mounting ends 434 and 436.

In this embodiment, outer edges 442 of top and bottom support rails 430 and 432 each includes an abutment flange 444. As seen in FIGS. 18 and 19, each of the flanges 444 is substantially U-shaped in cross-section and initially extends forwardly from support rails 430 and 432, then extends substantially parallel to support rails 430 and 432, and finally extends rearwardly relative to support rails 430 and 432. Flanges 444 provide additional rigidity to mounting bracket 412 as well as limit vertical movement of 4¹¹⁄₁₆ inch square electrical box 18 relative to mounting bracket 412.

As seen in FIG. 17, inner edges 440 of top and bottom support rails 430 and 432 are spaced preferably about 3⁹⁄₁₆ inches apart such that the shafts of screws 28 of the 4 inch square electrical box 24 substantially engages inner edges 440 of top and bottom support rails 430 and 432 so that the 4 inch square electrical box 24 cannot be substantially moved up or down relative to mounting bracket 412. Of course, it will be apparent to those skilled in the art that a small amount of clearance should be provided between inner edges 440 of support rails 430 and 432 and screws 28 of the 4 inch square electrical box 24. However, the clearance should not be too large so as to allow the screws (not shown) of the wiring device (not shown) which is to be attached to cover 26 to bottom out on either support rail 430 or 432.

Outer edges 42 of top and bottom support rails 30 and 32 are preferably spaced about 4¹¹⁄₁₆ inches to 4¹³⁄₁₆ inches apart such that the forwardly extending parts of abutment flanges 44 will engage the outer periphery of the 4¹¹⁄₁₆ inch square cover 20 to substantially prevent or limit up or down vertical movement of the 4¹¹⁄₁₆ inch square electrical box 18 relative to mounting bracket 12 when cover 20 is coupled thereto. In other words, abutment flanges 444 are designed to engage the outer periphery of the 4¹¹⁄₁₆ inch square cover 20 to limit or prevent vertical movement of the 4¹¹⁄₁₆ inch square electrical box 18 relative to mounting bracket 412. Preferably, the dimension between outer edges 442 of rails 430 and 432 can be slightly larger than the dimension of the 4¹¹⁄₁₆ inch square electrical box 18 to provide for dimensional irregularities in the parts of electrical mounting box assembly 410. In any event, the dimension between flanges 444 should not allow too much vertical movement of the 4¹¹⁄₁₆ inch square electrical box 18 such that the screws (not shown) of the wiring device (not shown) mounted to cover 20 via holes 70 will touch inner edges 440 of support rails 430 and 432.

Preferably, abutment flanges 444 are continuous flanges which are integrally formed with its associated support rails 430 and 432. As seen in FIGS. 18 and 19, abutment flanges 444 are angled slightly outwardly from rails 30 and 32 to allow for easy insertion of the 4¹¹⁄₁₆ inch square electrical box 18 therebetween as well as to allow stacking of mounting bracket 412 with other mounting brackets of similar construction. Preferably, the forwardly extending part of abutment flanges 444 form an angle of about ten degrees with its associated rail 30 or 32.

First and second mounting ends 434 and 436 are preferably substantially mirror images of each other, and each includes a hole 450 for receiving a fastener therethrough for attaching mounting bracket 412 to a pair of wall studs or support members. Any type of conventional fastener can be used such as a screw or a nail.

Preferably, each of the mounting ends 434 and 436 are bent to form a substantially flat attachment portion 452 which lies in a different plane from the top and bottom support rails 430 and 432. Preferably, attachment portions 452 are elevated from top and bottom support rails 430 and 432 and substantially parallel thereto. The distance by which the attachment portions 452 are raised from top and bottom support rails 430 and 432 is determined by the thickness of covers 20 and/or 26 as well as their attachment screws 22 and/or 28. Typically, attachment portions 452 are offset from top and bottom support rails 430 and 432 by about ¼ inch.

While only four embodiments have been chosen to illustrate the invention, it will be understood by those skilled in the art that various changes and modifications can be made herein without departing from the scope of the invention as defined in the appended claims.

What is claimed is:

1. A mounting bracket for selectively mounting both 4 inch square electrical boxes and 4¹¹⁄₁₆ inch square electrical boxes thereto and for attachment between first and second adjacent support members, comprising:

a top support rail having a front surface, a rear surface, an inner edge and an outer edge, said top support rail being free of mounting apertures for accommodating a fastener, said top support rail further having a top abutment;

a bottom support rail having a front surface, a rear surface, an inner edge and an outer edge, said bottom support rail being free of mounting apertures for accommodating a fastener, said bottom support rail further having a bottom abutment;

a first mounting end coupled to and extending between first ends of said top and bottom support rails, said first mounting end being adapted to be attached to the first support member; and a second mounting end coupled to and extending between second ends of said top and bottom support rails, said second mounting end being adapted to be attached to the second support member;

said top and bottom support rails being spaced apart by said first and second mounting ends to define an elongated central cut-out portion;

said inner edges of said top and bottom support rails being spaced apart by a distance which is substantially equal to or slightly greater than an outer distance measured between a pair of mounting holes in mounting ears of a 4 inch square electrical box, and said top and bottom abutments being spaced apart by a distance which is substantially equal to or slightly greater than a 4¹¹⁄₁₆ inch square electrical box's outer dimension, said top abutment extending rearwardly from said rear surface of said top support rail, and said bottom abutment extending rearwardly from said rear surface of said bottom support rail, said top abutment being formed by a plurality of top protrusions formed in said top support rail.

2. A mounting bracket according to claim 1, wherein said bottom abutment is formed by a plurality of bottom protrusions formed in said bottom support rail.

3. A mounting bracket according to claim 2, wherein said protrusions are spaced at least less than approximately two inches apart.

4. A mounting bracket according to claim 2, wherein said protrusions are formed substantially adjacent to said outer edges of said top and bottom support rails.

5. A mounting bracket according to claim 4, further comprising
a top flange extending rearwardly from said top support rail, and a bottom flange extending rearwardly from said bottom support rail, said top and bottom flanges being spaced outwardly relative to said top and bottom protrusions, respectively.

6. A mounting bracket for selectively mounting both 4 inch square electrical boxes and $4^{11}/_{16}$ inch square electrical boxes thereto and for attachment between first and second adjacent support members, comprising:
a top support rail having a front surface, a rear surface, an inner edge and an outer edge, said top support rail being free of mounting apertures for accommodating a fastener, said top support rail further having a top abutment;
a bottom support rail having a front surface, a rear surface, an inner edge and an outer edge, said bottom support rail being free of mounting apertures for accommodating a fastener, said bottom support rail further having a bottom abutment;
a first mounting end coupled to and extending between first ends of said top and bottom support rails, said first mounting end being adapted to be attached to the first support member; and
a second mounting end coupled to and extending between second ends of said top and bottom support rails, said second mounting end being adapted to be attached to the second support member;
said top and bottom support rails being spaced apart by said first and second mounting ends to define an elongated central cut-out portion;
said inner edges of said top and bottom support rails being spaced apart by a distance which is substantially equal to or slightly greater than an outer distance measured between a pair of mounting holes in mounting ears of a 4 inch square electrical box, and said top and bottom abutments being spaced apart by a distance which is substantially equal to or slightly greater than a $4^{11}/_{16}$ inch square electrical boxes outer dimension,
said top and bottom support rails being bent to form said top and bottom abutments,
said top abutment being formed on said front surface of said top support rail by a substantially continuous top shoulder, and said bottom abutment being formed on said front surface of said bottom support rail by a substantially continuous bottom shoulder,
a top flange extending rearwardly from said top support rail and a bottom flange extending rearwardly from said bottom support rail, said top and bottom flanges being spaced further apart than said top and bottom abutments.

7. An electrical box mounting bracket assembly for selectively mounting both 4 inch square electrical boxes and $4^{11}/_{16}$ inch square electrical boxes thereto and for attachment between first and second adjacent support members, comprising:
an electrical box having an annular side, a closed rear end and an open front end, said annular side having at least two inwardly extending mounting flanges with a threaded mounting hole in each of said mounting flanges;
a cover having a front surface, a rear surface and at least two mounting slots arranged in alignment with said mounting holes of said electrical box;
an electrical box mounting bracket coupled between said open front end of said electrical box and said rear surface of said cover, said electrical box mounting bracket including
a top support rail having a front surface, a rear surface, an inner edge and an outer edge, said top support rail being free of mounting apertures for accommodating a fastener, said top support rail further having a top abutment,
a bottom support rail having a front surface, a rear surface, an inner edge and an outer edge, said bottom support rail being free of mounting apertures for accommodating a fastener, said bottom support rail further having a bottom abutment,
a first mounting end coupled to and extending between first ends of said top and bottom support rails, said first mounting end being adapted to be attached to the first support member, and
a second mounting end coupled to and extending between second ends of said top and bottom support rails, said second mounting end being adapted to be attached to the second support member,
said top and bottom support rails being spaced apart by said first and second mounting ends to define an elongated central cut-out portion,
said inner edges of said top and bottom support rails being spaced apart by a distance which is substantially equal to or slightly greater than the distance between a pair of mounting holes in mounting ears of a 4 inch square electrical box, and said top and bottom abutments being spaced apart by a distance which is substantially equal to or slightly greater than a $4^{11}/_{16}$ inch square electrical box's outer dimensions,
said top abutment extending rearwardly from said rear surface of said top support rail, and said bottom abutment extending rearwardly from said rear surface of said bottom support rail,
said top abutment being formed by a plurality of top protrusions formed in said top support rail.

8. A mounting bracket according to claim 7, wherein said bottom abutment is formed by a plurality of bottom protrusions formed in said bottom support rail.

9. A mounting bracket according to claim 8, wherein said protrusions are spaced at least less than approximately two inches apart.

10. A mounting bracket according to claim 8, wherein said protrusions are formed substantially adjacent to said outer edges of said top and bottom support rails.

11. A mounting bracket according to claim 10, further comprising
a top flange extending rearwardly from said top support rail, and a bottom flange extending rearwardly from said bottom support rail, said top and bottom flanges being spaced outwardly relative to said top and bottom protrusions, respectively.

12. An electrical box mounting bracket assembly for selectively mounting both 4 inch square electrical boxes and 4$^{11}$/$_{16}$ inch square electrical boxes thereto and for attachment between first and second adjacent support members, comprising:

- an electrical box having an annular side, a closed rear end and an open front end, said annular side having at least two inwardly extending mounting flanges with a threaded mounting hole in each of said mounting flanges;
- a cover having a front surface, a rear surface and at least two mounting slots arranged in alignment with said mounting holes of said electrical box;
- an electrical box mounting bracket coupled between said open front end of said electrical box and said rear surface of said cover, said electrical box mounting bracket including
    - a top support rail having a front surface, a rear surface, an inner edge and an outer edge, said top support rail being free of mounting apertures for accommodating a fastener, said top support rail further having a top abutment,
    - a bottom support rail having a front surface, a rear surface, an inner edge and an outer edge, said bottom support rail being free of mounting apertures for accommodating a fastener, said bottom support rail further having a bottom abutment,
    - a first mounting end coupled to and extending between first ends of said top and bottom support rails, said first mounting end being adapted to be attached to the first support member, and
    - a second mounting end coupled to and extending between second ends of said top and bottom support rails, said second mounting end being adapted to be attached to the second support member,
- said top and bottom support rails being spaced apart by said first and second mounting ends to define an elongated central cut-out portion,
- said inner edges of said top and bottom support rails being spaced apart by a distance which is substantially equal to or slightly greater than the distance between a pair of mounting holes in mounting ears of a 4 inch square electrical box, and said top and bottom abutments being spaced apart by a distance which is substantially equal to or slightly greater than a 4$^{11}$/$_{16}$ inch square electrical box's outer dimensions,
- said top and bottom abutments being formed on said front surfaces of said top and bottom support rails,
- said top and bottom support rails being bent to form said top and bottom abutments,
- said top abutment being formed by a substantially continuous top shoulder, and said bottom abutment being formed by a substantially continuous bottom shoulder,
- a top flange extending rearwardly from said top support rail and a bottom flange extending rearwardly from said bottom support rail, said top and bottom flanges being spaced further apart than said top and bottom abutments.

* * * * *